US00RE45028E

(19) United States
(12) Reissued Patent
Edinger et al.

(10) Patent Number: US RE45,028 E
(45) Date of Reissued Patent: Jul. 22, 2014

(54) METHOD AND APPARATUS FOR LATERALLY ALIGNING A SHEET IN A PROCESSING MACHINE AND SHEET-FED PRINTING MACHINE HAVING THE APPARATUS

(71) Applicant: Heidelberger Druckmaschinen AG, Heidelberg, DE (US)

(72) Inventors: Holger Edinger, Weinheim (DE); Juergen Zeltner, Hirschberg (DE)

(73) Assignee: Heidelberger Druckmaschinen AG, Heidelberg (DE)

(21) Appl. No.: 13/667,510

(22) Filed: Nov. 2, 2012

Related U.S. Patent Documents

Reissue of:
(64) Patent No.: 8,146,915
Issued: Apr. 3, 2012
Appl. No.: 12/566,794
Filed: Sep. 25, 2009

(30) Foreign Application Priority Data

Sep. 25, 2008 (DE) ..... 10 2008 048 849

(51) Int. Cl.
*B65H 7/02* (2006.01)

(52) U.S. Cl.
USPC ..... 271/228; 271/277; 271/249

(58) Field of Classification Search
USPC ..... 271/228, 277, 249
See application file for complete search history.

(56) References Cited

U.S. PATENT DOCUMENTS

| | | | | |
|---|---|---|---|---|
| 4,833,989 | A * | 5/1989 | Wieland | 101/410 |
| 5,505,441 | A | 4/1996 | Sugiyama et al. | |
| 5,813,338 | A * | 9/1998 | Kojima et al. | 101/231 |
| 5,947,469 | A * | 9/1999 | Henn et al. | 271/228 |
| 6,264,196 | B1 * | 7/2001 | Lotsch | 271/228 |
| 7,156,390 | B2 * | 1/2007 | Eitel et al. | 271/245 |

FOREIGN PATENT DOCUMENTS

| | | | |
|---|---|---|---|
| DE | 694 03 579 | T2 | 1/1998 |
| EP | 0 753 407 | A2 | 1/1997 |
| EP | 1 334 829 | A2 | 8/2003 |
| EP | 1 354 833 | B1 | 5/2006 |

OTHER PUBLICATIONS

German Patent and Trademark Office Search Report, dated May 14, 2009.

* cited by examiner

*Primary Examiner* — Kaitlin Joerger
(74) *Attorney, Agent, or Firm* — Laurence A. Greenberg; Werner H. Stemer; Ralph E. Locher

(57) ABSTRACT

A method and an apparatus for laterally aligning a sheet in a processing machine, in particular a printing machine, carries out lateral sheet alignment on a cylinder of the printing machine, e.g. a feed cylinder. In order to achieve large correction distances in relation to a possible lateral movement capability of a gripper bar, the latter is prealigned prior to correction in such a way that, in the event of deviation from predetermined desired values, it is prealigned laterally to defined positions. A sheet-fed rotary printing machine having the apparatus, is also provided.

19 Claims, 4 Drawing Sheets

METHOD AND APPARATUS FOR LATERALLY ALIGNING A SHEET IN A PROCESSING MACHINE AND SHEET-FED PRINTING MACHINE HAVING THE APPARATUS

Matter enclosed in heavy brackets [ ] appears in the original patent but forms no part of this reissue specification; matter printed in italics indicates the additions made by reissue.

CROSS-REFERENCE TO RELATED APPLICATION

This application claims the priority, under 35 U.S.C. §119, of German Patent Application DE 10 2008 048 849.6, filed Sep. 25, 2008; the prior application is herewith incorporated by reference in its entirety.

BACKGROUND OF THE INVENTION

1. Field of the Invention

The invention relates to a method and an apparatus for laterally aligning a sheet in a processing machine, in particular a printing machine. The invention also relates to a sheet-fed printing machine having the apparatus.

It is known for the entire cylinder to be displaced for the lateral alignment of a sheet on a cylinder.

An alternative possibility is disclosed in European Patent EP 1 334 829 B1, in which only one sheet-gripping gripper device of a sheet-guiding cylinder is displaced. That gripper device has an actuating drive, which is disposed in a stationary manner in an extension of the cylinder axis, and a stationary actuating gear mechanism, which acts on the gripper bar through a driver and an axially disposed pulling rail, which rotates synchronously with the cylinder. A device providing for rotary disengagement between the actuating gear mechanism and pulling rail is disposed outside the cylinder.

European Patent EP 1 354 833 B1 discloses a method of prepositioning a gripper device on a cylinder of a printing machine in which, due to a sheet position being measured through the use of a sensor, the gripper device is displaced in each case by half the position-correction value in the opposite direction, corresponding to the correction, prior to the sheet being gripped. Once the sheet has been gripped, the gripper device is then displaced by the total correction value.

SUMMARY OF THE INVENTION

It is accordingly an object of the invention to provide a method and an apparatus for laterally aligning a sheet in a processing machine and a sheet-fed printing machine having the apparatus, which overcome the hereinafore-mentioned disadvantages of the heretofore-known apparatuses and methods of this general type and which operate with a higher degree of accuracy.

With the foregoing and other objects in view there is provided, in accordance with the invention, a method for laterally aligning sheets on a cylinder of a processing machine. The method comprises sensing an actual position of the sheet with at least one sensor, and prealigning a gripper device to a predetermined position in accordance with the actual position of the sheet relative to its side position, prior to the sheet being gripped by the gripper device.

With the objects of the invention in view, there is also provided an apparatus for laterally aligning sheets on a cylinder of a processing machine. The apparatus comprises an actuating drive for generating a linear movement, a connecting rod, a rotary disengagement device disposed in a cylinder body of the cylinder, a movably mounted gripper device, and a driver fastened on the gripper device and mounted rotatably and secured against displacement, on the connecting rod.

With the objects of the invention in view, there is additionally provided an apparatus for laterally aligning sheets on a cylinder of a processing machine. The apparatus comprises an actuating drive, a gripper device, and a gear mechanism, disposed in a cylinder body of the cylinder, for converting a rotary movement of the actuating drive into a linear movement of the gripper device.

The method and apparatus according to the invention can considerably reduce the distance required by the gripper device for alignment purposes.

In accordance with another mode of the invention, it is particularly advantageous for sheet-position determination to be divided up into rough determination and precision determination. The rough determination in this case is used for prepositioning the gripper device and the precision determination is used for aligning the sheet in accordance with a determined correction value.

In accordance with a further mode of the invention, placing a second sensor upstream, as seen in the sheet-transporting direction, results in a larger time window for prepositioning the gripper device.

In accordance with an added mode of the invention, a second measurement for determining the pulling distance, in particular only with the grippers of the gripper device closed, increases the accuracy of sheet alignment.

In accordance with an additional feature of the invention, an advantageous configuration of the actuating apparatus is provided by a rotary disengagement device being disposed in the interior of the cylinder. This measure means that the connecting rod, which is disposed in an extension of the actuating drive, is moved only during the aligning operation, or during prepositioning, and need not always be driven along with the cylinder.

In accordance with a concomitant feature of the invention, a further advantageous measure is constituted by gripper-control rollers being raised up from their control cams during prepositioning of the gripper device. This measure considerably reduces cam/roller wear.

Other features which are considered as characteristic for the invention are set forth in the appended claims.

Although the invention is illustrated and described herein as embodied in a method and an apparatus for laterally aligning a sheet in a processing machine and a sheet-fed printing machine having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
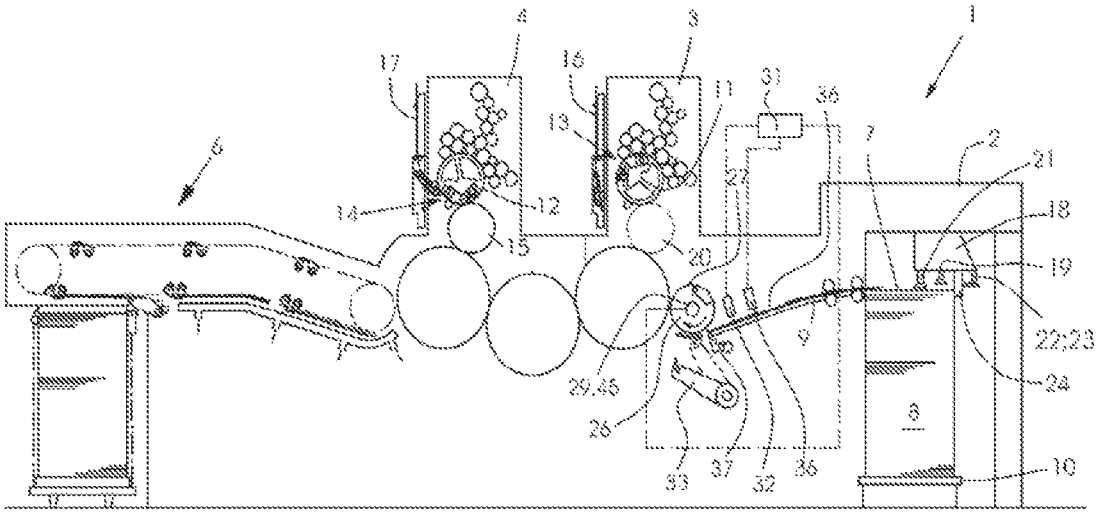
FIG. 1 is a diagrammatic, longitudinal-sectional view of a rotary printing machine.

Referring now to the figures of the drawings in detail and first, particularly, to FIG. 1 thereof, there is seen a machine for processing sheets 7, e.g. a printing machine 1, which has a feeder 2, at least one printing unit 3 or 4 and a delivery 6. The sheets 7 are removed from a sheet stack 8 and fed separately or in imbricated form to the printing units 3 and 4 over a feed table 9. These printing units each contain, in a known manner, a plate cylinder 11, 12 and blanket cylinders 15, 20, each of which interact with a respective one of the plate cylinders. The plate cylinders 11 and 12 each have a clamping device 13, 14 for fastening flexible printing plates. Furthermore, each plate cylinder 11, 12 is assigned a device 16, 17 for semiautomatic or fully automatic printing-plate changeover.

The sheet stack 8 rests on a stacking panel 10 which can be raised in a controlled manner. The sheets 7 are removed from the top side of the sheet stack 8 through the use of a so-called suction head 18 which has, inter alia, a number of lifting and pulling suckers 19, 21 for separating the sheets 7. Also provided are blowing devices 22 for loosening the top sheet layers and follower elements 23 for stack adjustment. A number of lateral and rear stops 24 are provided in order to align the sheet stack 8, in particular the top sheet 7 of the sheet stack 8.

In order to ensure lateral alignment of the sheets, these sheets are aligned on a cylinder of the printing machine 1, preferably on a feed cylinder 26, by virtue of a gripper device 27, which can be displaced on the cylinder 26 by being moved parallel to the axis of the feed cylinder 26. A stationary actuating motor 29 or linear drive 45 is provided in order to generate a lateral actuating movement of the gripper device 27. This motor or drive is driven in order to execute prealignment of the gripper device 27, e.g. of a gripper bar, or the precision alignment of the sheet. The actuating motor 29 or linear drive 45 is activated by way of a machine-control device 31, which receives position-related measuring data with respect to the sheet 7 from at least one sensor 32.

The sensor 32 (e.g. an LCD sensor) is disposed on the feed table 9 and, upon arrival of the sheet 7 at the end of the feed table 9, e.g. at front guides 37, senses the side edge of this sheet. The gripper device 27 is prealigned following a desired-value/actual-value comparison by the machine-control device 31. The operation in this case is carried out as follows:

If there is only a small amount of deviation of the actual value from the desired value (e.g. <1.5 millimeters), the gripper device 27 is not prealigned.

However, if the actual value is too far (e.g. 1.5 to 6 millimeters) to the drive side DS (to the right, as seen in the sheet-transporting direction), then the gripper device 27 is prealigned by a defined value (+3 millimeters) in relation to the drive side DS prior to the sheet being gripped by the gripper device.

If the actual value sensed is too far (e.g. −1.5 to −6 millimeters) to the operating side OS (to the left, as seen in the sheet-transporting direction), then the gripper device 27 is prealigned by a defined value (e.g. −3 millimeters) in relation to the operating side OS. This measure makes it possible to execute aligning distances of e.g. ±6 millimeters during alignment of the sheet, even though the gripper device 27 covers displacement distances of only ±3 millimeters.

Figure 2:
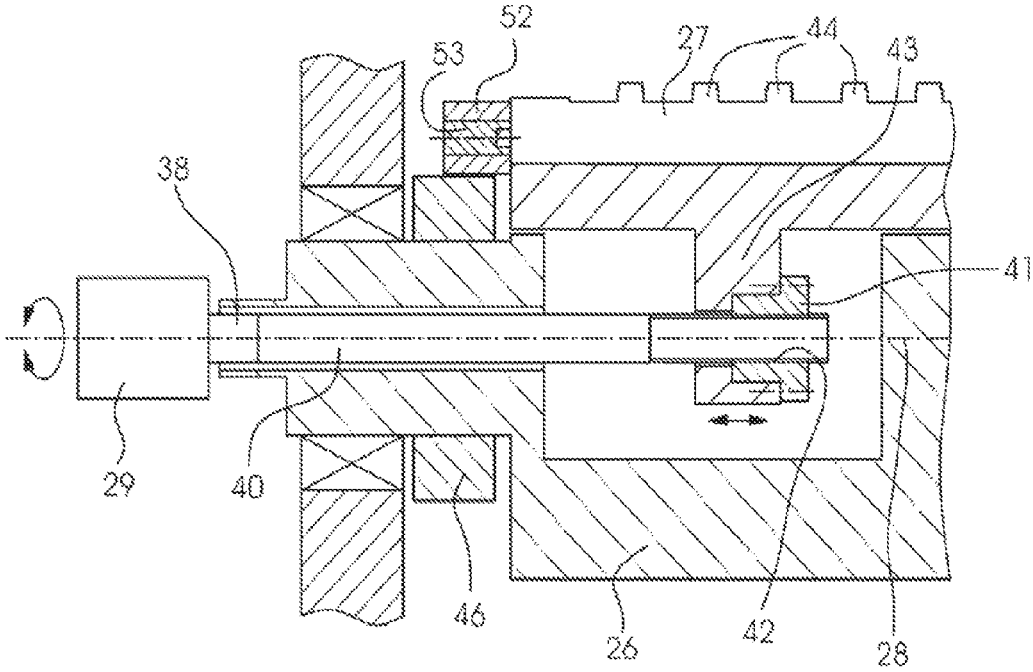
FIG. 2 is an enlarged, fragmentary, cross-sectional view of a cylinder with a laterally movable gripper device.

As soon as the sheet 7 is held with the grippers closed, e.g. by a pregripper 33 or by grippers 44 of the gripper device 27 as seen in FIG. 2, the side edge is subjected to a second measurement through the use of the sensor 32 in order to sense the actual position of the sheet 7 with the grippers closed. The machine-control device 31 uses a desired-value/actual-value comparison to determine a correction value, which is fed to the actuating motor 29 or linear drive 45. The actuating motor 29 or linear drive 45 is assigned to the gripper device 27 and displaces the latter in accordance with the determined correction value.

In the case of a second exemplary embodiment, provision is made for the prepositioning of the gripper device 27 to be controlled through the use of a second sensor 36, with the second sensor 36 being required just for correction-movement determination.

The sensor 36 in this case is, for example, a double switch which is disposed further away from the front guides 37, in order to sense the side edge of the sheet. This measure allows the prepositioning of the gripper device 27 to take place at a very early stage, that is to say that, even at a high processing speed, there is sufficient time available in order for the gripper device 27 to be prepositioned. The double switch 36 has two sensors, which are disposed transversely to the sheet-transporting direction, for example at a spacing of approximately 3 millimeters apart. This double switch 36 allows the determination of three switching states. If both sensors of the double switch 36 are actuated, the sheet is, for example, too far over to the operating side OS. If neither sensor of the double switch 36 is actuated, the sheet is too far over to the drive side DS. If the sheet is located in the central region, in which there is no need for the gripper device 27 to be prepositioned, only one sensor of the double switch 36 is actuated.

The actuating drive, e.g. the actuating motor 29 according to FIG. 2, is framework-mounted and has an actuating shaft 40 in extension of its drive axle 38. A gear mechanism 41 acts as a rotary disengagement device for converting a rotary movement into a linear movement (e.g. a nut/thread gear mechanism) which couples the actuating shaft 40 to a driver 43, which is fastened on the gripper device or bar 27. The gear mechanism 41 is disposed in the body of the cylinder 26. The gripper device or bar 27 carries the grippers 44, which are provided for transporting the sheet 7. The gripper device or bar 27 is mounted in such a way that it can be displaced parallel to the axis 28 of the feed cylinder 26.

Figure 3:
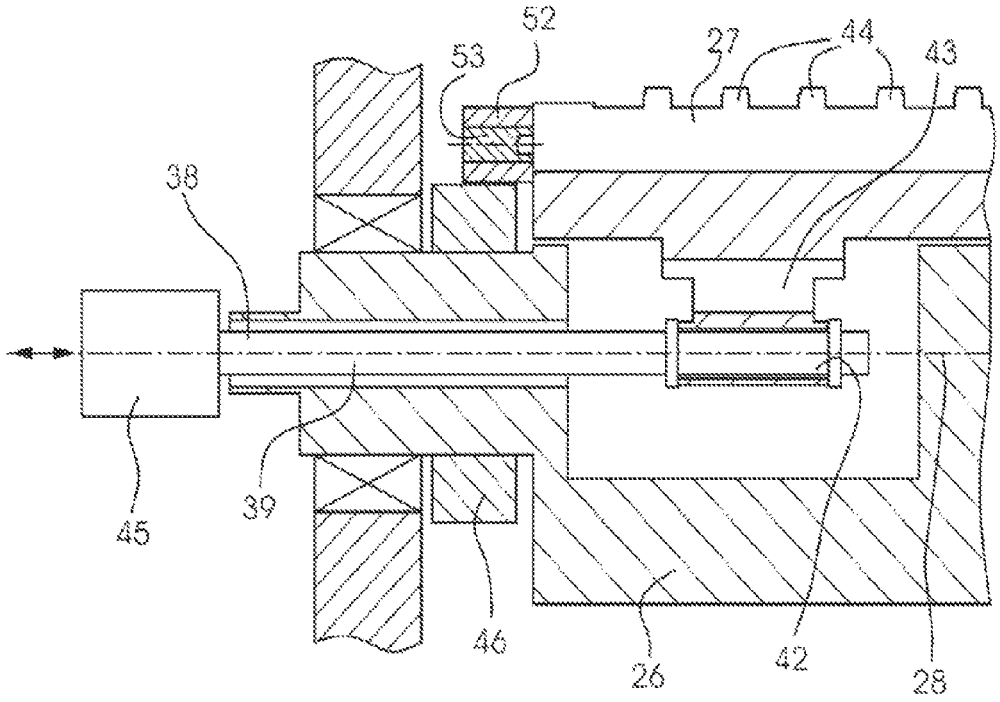
FIG. 3 is a view similar to FIG. 2 of an alternative embodiment with a linear drive.

An alternative exemplary embodiment according to FIG. 3 uses the linear motor 45 as the actuating drive. This linear motor is disposed in a stationary manner and has a displaceably-mounted connecting rod 39 in extension of its drive axle 38. The connecting rod 39 has, at its end, a bearing location 42 for a driver 43, which is fastened on the gripper device 27, constructed in the form of a gripper bar. The driver 43 is mounted in a rotatable manner as a rotary disengagement device on the connecting rod 39, but is secured against displacement on the connecting rod 39.

Figure 4:
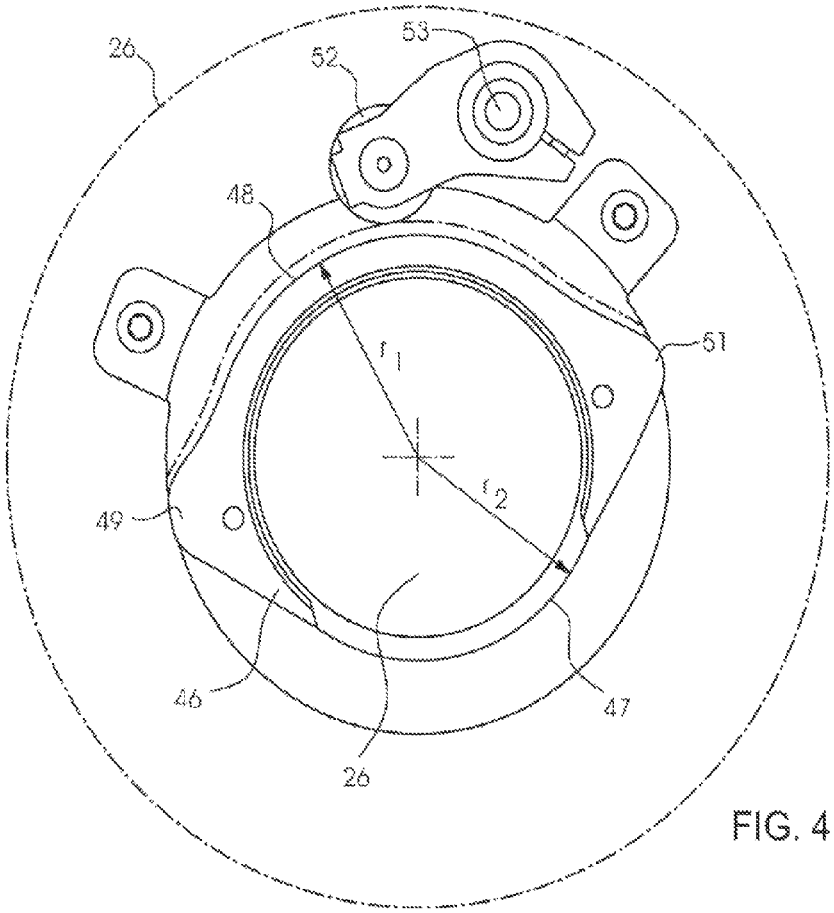
FIG. 4 is an elevational view of a control cam for raising up a gripper-opening control roller during prepositioning of the gripper device.

A stationary control cam 46 is provided in order to control the opening and closing movements of the grippers 44. This control cam, according to FIG. 4, has a contour 47 for a "transporting region" and a contour 48 for an "idling path" of the grippers 44. Two "control crests" 49, 51 enlarge the opening region of the grippers 44 at the locations where the sheet is received and transferred. The contour 48 has a significantly smaller radius $r_1$ than a radius $r_2$ of the contour 47, in which case a control roller 52 of a gripper shaft 53, which actuates the grippers 44, is spaced apart from the contour 48. This region, in which the control roller 52 is spaced apart from a control cam 46 or the contour 48 of the control cam 46, is used for prealigning the gripper device 27.

The invention claimed is:

1. A method for laterally aligning sheets on a cylinder of a processing machine, the method comprising the following steps:

sensing an actual position of the sheet with at least one sensor;

prealigning a gripper device to a predetermined position in accordance with the actual position of the sheet relative to its side position, prior to the sheet being gripped by the gripper device; and

[repeating the prealigning step]

*gripping the sheet with the gripper device in the predetermined position; and*

*aligning the sheet with the gripper device*, as needed, during a transfer of the sheet by the gripper device.

2. The method according to claim 1, which further comprises, with the grippers of the gripper device closed, sensing the sheet another time with the at least one sensor, and executing a lateral correction movement with the gripper device following a desired-value/actual-value comparison.

3. The method according to claim 1, which further comprises sensing the actual position of the sheet with another sensor for subsequent prealignment of the gripper device.

4. The method according to claim 1, which further comprises, during the prealignment of the gripper device, raising up a control roller for actuating grippers of the gripper device with a control cam for controlling opening and closing times of the grippers.

5. An apparatus for laterally aligning sheets on a cylinder of a processing machine, the apparatus comprising:

an actuating drive for generating a linear movement;

a connecting rod connected to said actuating drive;

a movably mounted gripper device;

a driver fastened on said gripper device and mounted rotatably and secured against displacement on said connecting rod; and a rotary disengagement device disposed in a cylinder body of the cylinder and interconnecting said connecting rod and said driver.

6. An apparatus for laterally aligning sheets on a cylinder of a processing machine, the apparatus comprising:

a stationary linear actuating drive disposed outside the cylinder;

a gripper device; and a gear mechanism, disposed in a cylinder body of the cylinder, for converting a rotary movement of said actuating drive into a linear movement of said gripper device.

7. The apparatus according to claim 6, wherein said gear mechanism has a driver fastened on said gripper device.

8. The apparatus according to claim 7, which further comprises a rotatably drivable actuating shaft for actuating said gear mechanism.

9. The apparatus according to claim 8, wherein said actuating shaft is configured to be driven by said actuating drive.

10. The apparatus according to claim 5, which further comprises a control cam, and a control roller in operative contact with said control cam for actuating grippers of said gripper device, said control roller being spaced apart from said control cam during prealignment of said gripper device.

11. The apparatus according to claim 6, which further comprises a control cam, and a control roller in operative contact with said control cam for actuating grippers of said gripper device, said control roller being spaced apart from said control cam during prealignment of said gripper device.

12. The apparatus according to claim 10, wherein said control cam has a transporting-path region with a contour having a radius and an idling-path region with a contour having a smaller radius than said radius of said contour in said transporting-path region.

13. The apparatus according to claim 11, wherein said control cam has a transporting-path region with a contour having a radius and an idling-path region with a contour having a smaller radius than said radius of said contour in said transporting-path region.

14. The apparatus according to claim 5, which further comprises a machine-control device, and at least one sensor connected through said machine-control device to said actuating drive for sensing a sheet position.

15. The apparatus according to claim 6, which further comprises a machine-control device, and at least one sensor connected through said machine-control device to said actuating drive for sensing a sheet position.

16. The apparatus according to claim 14, which further comprises another sensor connected through said machine-control device to said actuating drive for sensing a sheet position, said sensors being spaced apart from one another in a sheet-transporting direction.

17. The apparatus according to claim 15, which further comprises another sensor connected through said machine-control device to said actuating drive for sensing a sheet position, said sensors being spaced apart from one another in a sheet-transporting direction.

18. A sheet-fed rotary printing machine, comprising an apparatus according to claim 5.

19. A sheet-fed rotary printing machine, comprising an apparatus according to claim 6.

* * * * *